(12) United States Patent
Shi (10) Patent No.: US 8,477,688 B2
(45) Date of Patent: Jul. 2, 2013

(54) METHOD, SYSTEM AND APPARATUS FOR NOTIFYING AS OF USER STATE

(75) Inventor: Shufeng Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 478 days.

(21) Appl. No.: 12/685,405

(22) Filed: Jan. 11, 2010

(65) Prior Publication Data

US 2010/0124199 A1 May 20, 2010

Related U.S. Application Data

(63) Continuation of application No. PCT/CN2008/071562, filed on Jul. 7, 2008.

(30) Foreign Application Priority Data

Jul. 13, 2007 (CN) .......................... 2007 1 0130688

(51) Int. Cl.
*H04W 4/00* (2009.01)
*H04L 12/28* (2006.01)

(52) U.S. Cl.
USPC ................ 370/328; 370/338; 370/395.21

(58) Field of Classification Search
USPC ............... 370/310, 328, 395.2, 38, 395.23
See application file for complete search history.

(56) References Cited

U.S. PATENT DOCUMENTS

| | | | |
|---|---|---|---|
| 7,650,149 B2 * | 1/2010 | Tammi et al. ............... | 455/435.2 |
| 2003/0186681 A1 * | 10/2003 | Gabor ........................... | 455/411 |
| 2004/0043756 A1 | 3/2004 | Haukka et al. | |
| 2004/0122901 A1 | 6/2004 | Sylvain | |
| 2005/0065801 A1 | 3/2005 | Poikselka et al. | |
| 2005/0170861 A1 | 8/2005 | Niemi et al. | |
| 2006/0052084 A1 * | 3/2006 | Diebold et al. ............... | 455/410 |
| 2007/0067807 A1 * | 3/2007 | O'Neil ............................ | 725/62 |
| 2007/0207805 A1 * | 9/2007 | Pallares Lopez et al. ..... | 455/436 |
| 2008/0104696 A1 | 5/2008 | Ll et al. | |

(Continued)

FOREIGN PATENT DOCUMENTS

| | | |
|---|---|---|
| CN | 1615630 A | 5/2005 |
| CN | 1663216 A | 8/2005 |
| CN | 1953390 A | 4/2007 |
| CN | 1968291 A | 5/2007 |
| CN | 101345748 A | 1/2009 |
| EP | 1775092 A1 | 4/2007 |
| EP | 1775902 A1 | 4/2007 |
| WO | WO 2006/070226 A1 | 7/2006 |
| WO | WO 2007009498 A1 | 1/2007 |

OTHER PUBLICATIONS

Office Action issued in corresponding German Patent Application No. 112008001847.2, mailed Feb. 29, 2012.

(Continued)

*Primary Examiner* — Warner Wong
(74) *Attorney, Agent, or Firm* — Brinks Hofer Gilson & Lione (57) ABSTRACT

Disclosed is a method for notifying the state of a user to an Application Server (AS), including: receiving, by a Serving-Call Session Control Function (S-CSCF), new service profile information of the user sent from a Home Subscriber Server (HSS) when the user's service profile changes; and sending, by the S-CSCF, registration information of the user to the AS. The disclosure also relates to a system for notifying the state of a user to an AS, the system including an HSS, an S-CSCF and the AS. The disclosure also provides a corresponding S-CSCF, a system for notifying the state of a user to an AS, and a corresponding AS. According to the invention, an AS may obtain the registration state of a user timely.

4 Claims, 3 Drawing Sheets

U.S. PATENT DOCUMENTS

| | | | |
|---|---|---|---|
| 2008/0176538 A1* | 7/2008 | Terrill et al. | 455/414.1 |
| 2008/0189414 A1* | 8/2008 | Astrom et al. | 709/225 |
| 2008/0247385 A1* | 10/2008 | Witzel et al. | 370/352 |
| 2009/0011763 A1* | 1/2009 | Torres | 455/435.1 |
| 2009/0093249 A1* | 4/2009 | Zhu et al. | 455/433 |
| 2009/0219843 A1* | 9/2009 | Chin et al. | 370/310 |
| 2010/0008252 A1* | 1/2010 | Alve | 370/252 |
| 2012/0020350 A1* | 1/2012 | Tai et al. | 370/352 |
| 2012/0063582 A1* | 3/2012 | Naqvi et al. | 379/201.04 |
| 2012/0307734 A1* | 12/2012 | Cai et al. | 370/328 |

OTHER PUBLICATIONS

Written Opinion of the International Searching Authority issued in corresponding PCT Patent Application No. PCT/CN2008/071562, mailed Oct. 9, 2008.

Day et al., "Instant Messaging / Presence Protocol Requirements" Network Working Group, Feb. 2000.

Lte, "$3^{rd}$ Generation Partnership Project; Technical Specification Group Core Network and Terminals; IP Multimedia (IM) Subsystem Cx and DX Interfaces; Signaling Flows and Message Contents" (Release 10) 3GPP TS 29.228, V10.2.0. Jun. 2011.

Lte, "$3^{rd}$ Generation Partnership Project; Technical Specification Group Core Network and Terminals; IP Multimedia Call Control Protocol Based on Session Initiation Protocol (SIP) and Session Description Protocol (SDP)" Stage 3 (Release 10) 3GPP TS 24.229, V10.4.0. Jun. 2011.

Unknown Author, "IP Multimedia Subsystem—IMS Technology and Application" Communications Today, China Academic Journal Electronic Publishing House 2006.

* cited by examiner

METHOD, SYSTEM AND APPARATUS FOR NOTIFYING AS OF USER STATE

CROSS REFERENCE TO RELATED APPLICATIONS

This application is a continuation of International Patent Application No. PCT/CN2008/071562, filed on Jul. 7, 2008, which claims priority to Chinese patent application No. 200710130688.5, filed on Jul. 13, 2007; both of which are incorporated by reference herein in their entireties.

FIELD OF THE INVENTION

The invention relates to the technical field of communications, and more particularly, to a method and a system for notifying the state of a user to an Application Server (AS), a Serving-Call Session Control Function (S-CSCF), and an AS.

BACKGROUND

With technological developments, multimedia communications are more and more widely applied in mobile communications. Current multimedia communications are not simple video and audio communications, but also include services like instant messaging, co-address browsing, cooperative work, streaming media, etc. In particular, services combining new communication means and traditional voices together are becoming more and more popular with subscribers.

Based on a trend that Internet and conventional telecommunication networks are converged increasingly at the present stage, various standardization organizations have proposed the concept of Next Generation Network (NGN) so as to meet requirements of the current terminal users for more novel and more diversified multimedia services. On the basis of packet bearing networks, an IP Multimedia Subsystem (IMS) is introduced for the all Internet Protocol (IP) service network architecture.

In the IMS, a service profile stored in a Home Subscriber Server (HSS) is a set of user profile information, including user profile data associated with a service. A Serving-Call Session Control Function (S-CSCF) may obtain the service profile data of a user from the HSS via a pair of commands like Server-Assignment-Request/Server-Assignment-Answer (SAR/SAA). Alternatively, the HSS may update the changed service profile data to the S-CSCF via a pair of commands like Push-Profile-Request/Push-Profile-Answer (PPR/PPA).

The service profile further includes four parts: Public Identification, Core Network Service Authorization, Initial Filter Criteria (iFC), and Shared iFC Set.

An iFC is used for triggering a service and includes service triggering points, which describe in what a condition a received Session Initiation Protocol (SIP) message will be routed to which AS, i.e., in what a condition the subscriber's service may be performed.

In a service implementation flow of an AS, first, a user is registered with a network. At the same time, the user service profile information including the iFC is downloaded from the HSS to the S-CSCF serving the subscriber. Then, the user may initiate an associated SIP service request with his/her User Equipment (UE). The request passes through a Proxy-Call Session Control Function (P-CSCF) to reach its home S-CSCF. Then, the S-CSCF may find an iFC matching the initiator of the request, and forward the request directly or route the request to the corresponding Application Servers based on the content of the iFC included in the user service profile information. Finally, the AS may provide the associated service to the subscriber.

In practical applications, a user may often need to change the content of the user service profile, for example, he may subscribe to a new service, or cancel a subscribed service. Further, a subscribed service generally may be in an active state or in an inactive state. The user may often change the state of a subscribed service, for example, he may change the subscribed service from an active state to an inactive state, or vice versa. When the content of the subscriber's service profile changes, the iFC within the service profile will change correspondingly. When a new service is subscribed, a new iFC is added or some new service trigger points are added to an existing iFC. When a subscribed service is cancelled, the corresponding iFC is removed or some service trigger conditions are removed from an iFC. When a subscribed service is changed from the inactive state to the active state, the corresponding iFC is downloaded to the S-CSCF with which the user is registered. When an active service is changed to the inactive state, the corresponding iFC is removed from the S-CSCF with which the user is registered.

At this time, the HSS will send the updated service profile information of the user to the S-CSCF of the user via the PPR/PPA. The S-CSCF updates the stored service profile information of the user. Meanwhile, the S-CSCF may perform a synchronized data update for the UE and other IMS entities.

In the currently used synchronization schemes, based on the subscription to notification mechanism for the UE and other IMS entities that subscribed to the user's registration event, the update of the user's registration state is notified to the UE and other IMS entities having subscription to the registration event notification of the user from the S-CSCF via an SIP-based NOTIFY message.

The user's registration state refers to the registration state of the user in the network, for example, it may be a registered state or an unregistered state. When the user modifies the service profile information, the AS related to the newly subscribed or newly activated service can offer the service to the user timely only when having knowledge of the registration state of the user.

During research and implementation of the prior art, the inventors have found the disadvantage of the prior art as follows. After the user has registered with the network, when the user newly subscribes to or activates a new service, the AS related to the newly subscribed or newly activated service typically will not subscribe for the registration event notification of the user from the S-CSCF. Therefore, the AS cannot obtain the registration state of the user at the first time, which will prevent the AS from timely providing the newly subscribed service or newly activated service to the user.

SUMMARY

An embodiment of the invention provides a method and a system for notifying the state of a user to an AS, an S-CSCF, and an AS. With the invention, an AS may obtain the registration state of a user in the network. The objects of the invention may be achieved with the following technical solutions.

A method is provided, including:

receiving, by a Serving-Call Session Control Function (S-CSCF), new service profile information of a user from a Home Subscriber Server (HSS) when the user's service profile changes; and sending, by the S-CSCF, registration information of the user to a corresponding Application Server (AS).

A method is further provided, including:
receiving, by a Serving-Call Session Control Function (S-CSCF), a subscription message sent from an Application Server (AS) to subscribe for the registration event notification of a user when the AS knows a change in the service profile information of the user; and
sending the registration information of the user to the AS after the S-CSCF receives the subscription message.

A system is provided, including:
a Home Subscriber Server (HSS), configured to send new service profile information of a user;
a Serving-Call Session Control Function (S-CSCF), configured to receive the service profile information, and to send registration information of the user after receiving the service profile information; and
an Application Server (AS), configured to receive the registration information of the user.

An S-CSCF is provided, including:
a receiving unit, configured to receive new service profile information of a user sent from a Home Subscriber Server (HSS); and
a notifying unit, configured to send registration information of the user to a corresponding Application Server (AS) after receiving the service profile information.

A system is further provided, including:
an Application Server (AS), configured to send a subscription message to subscribe for the registration event notification of a user when knowing a change in the service profile information of the user; and
a Serving-Call Session Control Function (S-CSCF), configured to send registration information of the user to the AS after receiving the subscription message.

An AS is provided, including:
an inquiring unit, configured to inquire about a change in service profile information of a user; and
a transmitting unit, configured to send a subscription message to subscribe for the registration event notification of the user to a Serving-Call Session Control Function (S-CSCF) in which the user resides when the inquiring unit detects a change in the service profile information of the user.

According to the invention as described above, when a change in the service profile information of the user is known, the registration information of the user is sent to a corresponding AS so that the AS may know the registration state of the user in the network timely. In this way, the AS may provide newly subscribed services or activated services for the user timely.

DETAILED DESCRIPTION

An embodiment of the invention provide a method and a system for notifying the state of a user to an AS, an S-CSCF, and an AS, so that the AS may obtain the registration state of the user in the network timely.

With the method for notifying the state of the user to the AS according to an embodiment of the invention, the S-CSCF in which the user resides may send the registration information of the user to the corresponding AS when knowing a change in the service profile information of the user, so that the AS may obtain the registration state of the user in the network timely.

Figure 1:
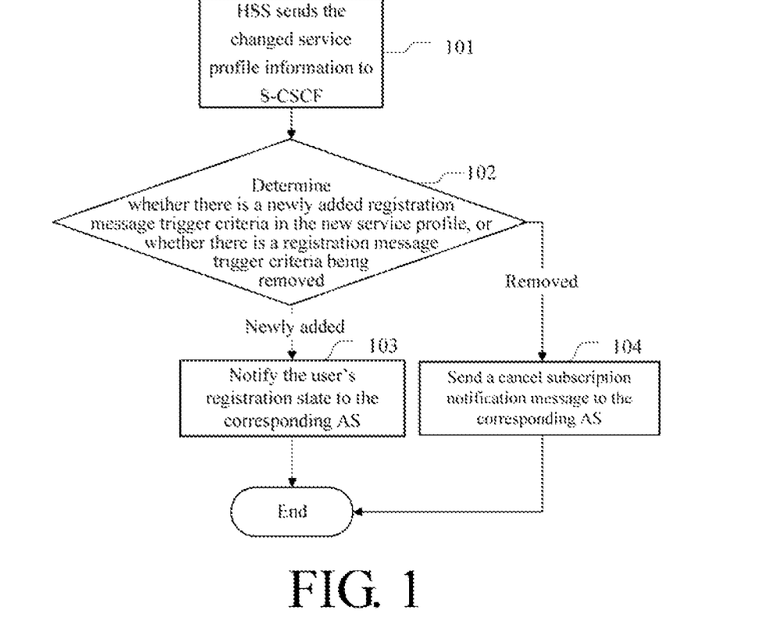
FIG. 1 is a flow chart showing a first embodiment of a method for notifying the state of a user to an AS according to an embodiment of the invention.

FIG. 1 is a flow chart showing a first embodiment of a method for notifying the state of a user to an AS.

In step 101, the service profile information of the user changes, and the HSS sends the changed service profile information of the user to the S-CSCF.

When a change occurs to the service profile information of the user in the HSS, the HSS initiates a PPR message to the S-CSCF, and carries the changed service profile information in the message to the S-CSCF.

In step 102, a determination is made as to whether there is a newly added registration message trigger criteria in the new service profile information, or whether there is a registration message trigger criteria removed from the new service profile information. If a registration message trigger criteria is newly added, the process proceeds to step 103. If a registration message trigger criteria is removed, the process proceeds to step 104.

The PPR message carries an IP Multimedia Public User Identity (IMPU) of the user and the corresponding service profile. In a case where implicit registration is allowed, a user may register multiple IMPUs with a network. These IMPUs belonging to the same user are within the same implicit registration set. In this case, the PPR message may carry all IMPUs in the implicit registration set and the corresponding service profiles.

Upon receiving a PPR indicating a change in the user's service profile information, the S-CSCF compares an original iFC stored in the S-CSCF with the newly received iFC before updating the service profile information of the user stored in the S-CSCF corresponding to the IMPUs carried in the PPR message. From the comparison, it can be determined what occurs in the content of the service profile: whether an iFC containing a new registration message trigger criteria is newly added or a new registration message trigger criteria is added to an original iFC due to a newly subscribed service or a newly activated service; whether an iFC containing a registration message trigger criteria is removed or a registration message trigger criteria is removed from an iFC because a subscribed service is removed or an active service becomes inactive now.

When a change occurs to the service profile information, many different changes may be involved sometimes, for example: a new service is subscribed, an original service is removed, an inactive service is activated, or an active service changes to inactive state. All of them may occur simultaneously, or some of them may occur, or only one of them may occur. In this step, it might be determined that a registration message trigger criteria is newly added while a registration message trigger criteria is removed. In this case, both step 103 and step 104 will be performed. The two steps may be performed simultaneously or in a sequential order.

In step 103, a re-registration procedure is initiated so that the registration information of the user can be sent to the corresponding AS.

A UE corresponding to the IMPU with the changed service profile may initiate a re-registration with the network. During the re-registration procedure of the UE, the S-CSCF with which the UE is registered will perform a third party registration with an AS matching the registration message trigger criteria in the iFC contained in the user service profile information, so that the registration information of the user is sent to the corresponding AS. Through this procedure, the AS may know that the registration state of the UE is "registered" now.

If the AS related to a newly subscribed or newly activated service are notified without considering a service being removed or an active service being changed to be inactive, the comparison of step 102 is not necessary. Instead, upon receiving the PPR message, the UE corresponding to the IMPU with the changed service profile information may initiate a re-registration procedure directly. The AS matching the registration message trigger criteria in the iFC contained in the new service profile information will receive the registration information associated with the UE.

Examples are given below for a detailed description.

After the IP Multimedia Public User Identity (for example, IMPU1) of a user is registered with the network, a registration event notification is subscribed from the S-CSCF. When the service profile data for IMPU1 changes, the HSS may update the service profile data for IMPU1 in the S-CSCF via a command pair PPR/PPA. At this time, the S-CSCF may compare its originally stored profile data for IMPU1 with the new profile data carried in the PPR. If an iFC including a new registration message trigger criteria is newly added, or a new registration message trigger criteria is added to an original iFC, the UE associated with IMPU1 for the changed service profile may be triggered to initiate a re-registration with the network. In this way, the S-CSCF may notify the registration state of the user to the AS corresponding to the iFC.

The S-CSCF sends a NOTIFY message to the registered UE corresponding to IMPU1, so that the UE corresponding to IMPU1 with the changed service profile will initiate a re-registration with the network.

Alternatively, after receiving a PPR message indicating a change in the service profile data for IMPU1 from HSS, the S-CSCF may send a NOTIFY message to the registered UE corresponding to IMPU1 directly without comparison between the original iFC and the new iFC.

In the message body, the sub-element <uri> in the sub-element <contact> in the element <registration> may be set to the contact address corresponding to the registered UE: 5555::aaa:bbb:ccc:ddd;

the aor attribute in the element <registration> is set to IMPU1;

the state attribute in the element <registration> is set to "active";

the state attribute in the element <contact> is set to "active";

the event attribute in the element <contact> is set to "shortened"; and the expires attribute in the element <contact> is set to a relatively small value configured by the operator.

A properly set NOTIFY message may have a format as follows:

```
NOTIFY sip:[5555::aaa:bbb:ccc:ddd]:1357;comp=sigcomp SIP/2.0
Via: SIP/2.0/UDP scscf.homedomain.com;branch=z9hG4bK332b23.1
Max-Forwards: 70
Route: <sip:pcscf. homedomain.com;lr>
From: <sip: IMPU1@homedomain.com>;tag=31415
To: <sip: IMPU1@homedomain.com>;tag=151170
Call-ID:
CSeq: 42 NOTIFY
Subscription-State: active;expires=3200
Event: reg
Content-Type: application/reginfo+xml
Contact: <sip:scscf.homedomain.com>
Content-Length: (. . .)
<?xml version="1.0"?>
<reginfo xmlns="urn:ietf:params:xml:ns:reginfo"
                version="1" state="partial">
  <registration aor="sip: IMPU1@homedomain.com" id="a7"
state="active">
    <contact id="76" state="active" event="shortened" expires="600">
            <uri>sip:[5555::aaa:bbb:ccc:ddd]</uri>
        </contact>
    </registration>
</reginfo>
```

After receiving this NOTIFY message, the UE corresponding to IMPU1 with the changed service profile will initiate a re-registration with the network. The S-CSCF may initiate a third party registration with the AS corresponding to the iFC containing the registration message trigger criteria in the user's service profile information, notifying the corresponding AS of the registration state of the user, so that the AS may provide a newly subscribed service or activated service for the user timely.

One IMPU might be shared among multiple UEs. If the IMPU has been registered by multiple UEs in the S-CSCF, the S-CSCF may decide to trigger each UE to re-register so that the AS is notified of the registration state of the user. Alternatively, at least one of the UEs may be triggered to initiate a re-registration procedure.

In step 104, the S-CSCF sends a cancel subscription message to the corresponding AS, to notify the AS of the user's registration state.

After the user removes some subscribed services or changes some active services to be inactive, if it is desired to notify the registration state of the user to the AS related to the associated services, the process needs to proceed step 102, in which a comparison is made between the original iFC and the new iFC to determine whether a registration message trigger criteria is removed. If an iFC including a registration message trigger criteria is removed or a registration message trigger criteria included in an iFC is removed, it indicates that the corresponding AS has subscribed the registration event notification of the user on the S-CSCF. The S-CSCF then generates and sends a cancel subscription message to the AS matching the removed registration message trigger criteria. The AS is notified of the user's registration state, and the subscription of the user's registration event from the AS is cancelled.

Figure 2:
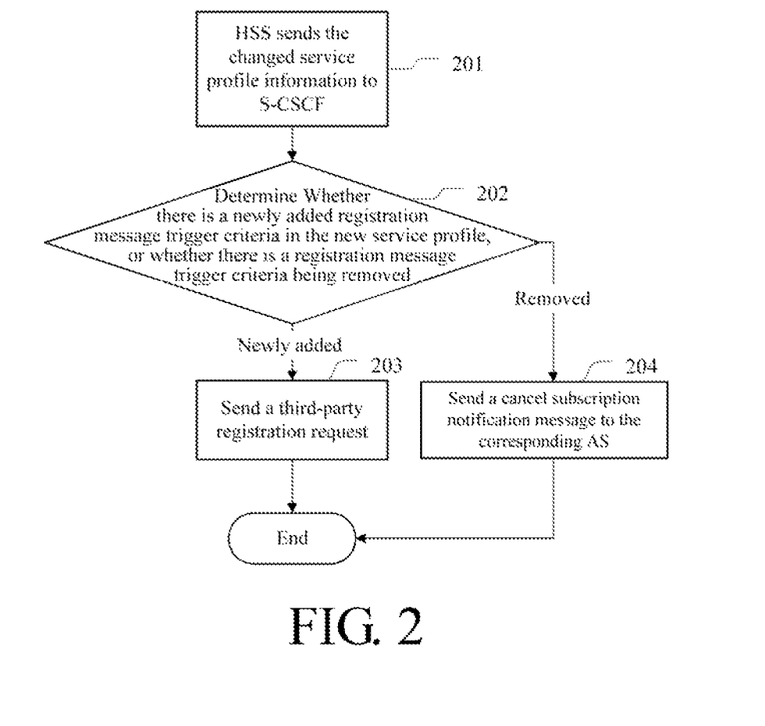
FIG. 2 is a flow chart showing a second embodiment of a method for notifying the state of a user to an AS according to an embodiment of the invention.

FIG. 2 is a flow chart showing a second embodiment of a method for notifying the state of a user to an AS.

In step 201, the service profile information of the user changes, and the HSS transmits the changed service profile information of the user to the S-CSCF.

When a change occurs to the service profile information of the user in the HSS, the HSS initiates a PPR message to the S-CSCF, and carries the changed service profile information in the message to the S-CSCF.

In step 202, a determination is made as to whether there is a newly added registration message trigger criteria in the new service profile information, or whether there is a registration message trigger criteria removed. If a registration message trigger criteria is newly added, the process proceeds to step 203. If a registration message trigger criteria is removed, the process proceeds to step 204.

The PPR message carries an IP Multimedia Public User Identity (IMPU) of the user and the corresponding service profile. In a case where implicit registration is allowed, a user may register multiple IMPUs with a network. These IMPUs belonging to the same user are within the same implicit registration set. In this case, the PPR message may carry all IMPU(s) in the implicit registration set and the corresponding service profiles.

Upon receiving a PPR indicating a change in the user's service profile information, the S-CSCF compares an original iFC with the new iFC before updating the service profile information of the user corresponding to the IMPUs carried in the PPR message and being stored in the S-CSCF. From the comparison, it can be determined what occurs to the content of the service profile: whether an iFC containing a new registration message trigger criteria is newly added or a new registration message trigger criteria is added to an original iFC due to a newly subscribed service or a newly activated service; whether an WC containing a registration message trigger criteria is removed or a registration message trigger criteria is removed from an iFC because a subscribed service is removed or an active service becomes inactive now.

When a change occurs to the service profile information, many different changes may be involved sometimes, for example: a new service is subscribed, an original service is removed, an inactive service is activated, or an active service changes to inactive state. All of them may occur simultaneously, or some of them may occur, or only one of them may occur. In this step, it might be determined that a registration message trigger criteria is newly added while a registration message trigger criteria is removed. In this case, both step 203 and step 204 will be performed. The two steps may be performed simultaneously or in a sequential order.

In step 203, a third-party registration request is sent, and the registration information of the user is carried to the corresponding AS.

Based on the latest service profile information carried in the PPR message, the S-CSCF may generate and send a third party REGISTER message to an AS corresponding to an iFC including the newly added registration message trigger criteria, so as to notify the AS of the user's registration state.

If the AS related to a newly subscribed or newly activated service are notified without considering a service being removed or an active service being changed to be inactive, the comparison of step 202 is not necessary. Instead, upon receiving the PPR message, a third party REGISTER request may be sent directly to the AS corresponding to the iFC containing the registration message trigger criteria in the new service profile information, so as to notify the AS of the user's registration state.

In step 204, the S-CSCF sends a cancel subscription message to the corresponding AS, to notify the AS of the user's registration state.

After the user removes some subscribed services or changes some active services to be inactive, if it is desired to notify the registration state of the user to the AS related to the associated services, the process proceeds to step 202, in which a comparison is made between the original iFC and the new iFC to determine whether a registration message trigger criteria is removed. If an iFC including a registration message trigger criteria is removed or a registration message trigger criteria in an iFC is removed, it indicates that the corresponding AS has subscribed the registration event notification of the user on the S-CSCF. The S-CSCF generates and sends a cancel registration message to the AS matching the removed registration message trigger criteria. The AS is notified of the user's registration state, and at the same time, the subscription of the user registration event from the AS is cancelled.

Figure 3:
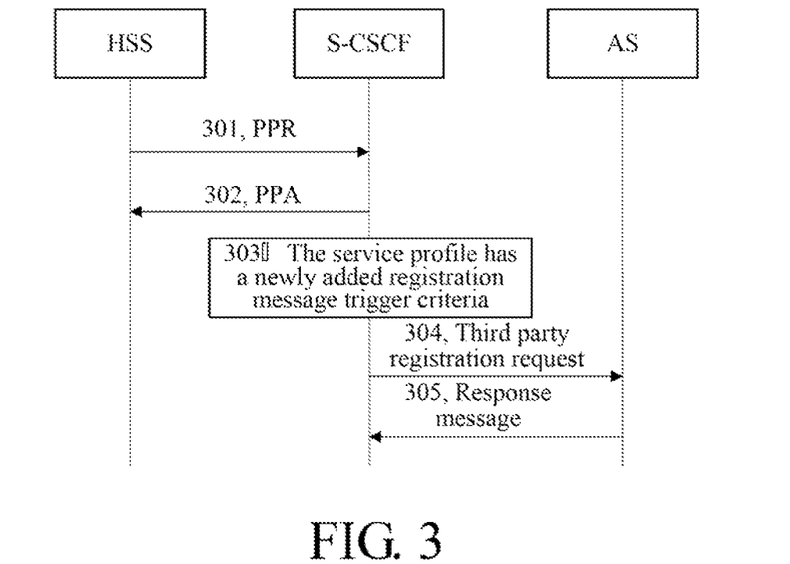
FIG. 3 is a flow chart showing the signaling for transmission of a third-party registration request according to an embodiment of the invention.

FIG. 3 is a flow chart showing the signaling for sending a third-party registration request according to the second embodiment of the method for notifying the state of the user to the AS.

In step 301, the HSS sends a PPR message to the S-CSCF.

For example, the user may register two IMPUs (IMPU1 and IMPU2) with the network. Although IMPU1 and IMPU2 belong to the same implicit registration set, they may have different service profiles. When the service profile data for IMPU1 or IMPU2 changes, the HSS sends a PPR message to the S-CSCF. The service profile data for IMPU1 and IMPU2 is sent to the S-CSCF via the PPR command.

In step 302, the S-CSCF returns a PPA message to the HSS.

The S-CSCF may compare its originally stored service profile data for IMPU1 and IMPU2 with the new service profile data carried in the PPR, to determine whether a registration message trigger criteria is newly added. Meanwhile, based on the service profile data for IMPU1 and IMPU2 carried in the PPR message, the S-CSCF may update the stored service profile data for IMPU1 and IMPU2. A PPA indicating the operation result is returned to the HSS.

In step 303, the comparison result indicates that the service profile information has a newly added registration message trigger criteria.

By comparing the originally stored service profile data for IMPU1 and IMPU2 with the new service profile data carried in the PPR, the S-CSCF may find that an iFC including a new registration message trigger criteria is newly added, or a new registration message trigger criteria is newly added to an original iFC.

In step 304, the S-CSCF generates and sends a third party REGISTER message to an AS matching the new registration message trigger criteria and corresponding to the iFC containing the registration message trigger criteria.

When the user changes the content of a service profile, many services may be added or activated, which may relate to multiple ASs. In this step, a REGISTER message is thus sent to the AS matching the new registration message trigger criteria, to notify the AS of the user's registration state. In this way, the AS may provide a newly subscribed service or activated service to the user timely.

Alternatively, the S-CSCF may directly generate and send the REGISTER message to the AS related to the new service profile without having a comparison between the original iFC and the new iFC.

In step 305, the AS returns a response message 200OK, and the flow ends.

A third embodiment of the method for notifying the state of a user to an AS according to the invention is described as follows.

The user may change the service profile information, for example, the user may subscribe to a new service or activate a service, which will lead to some changes on the corresponding AS. At this time, the AS may need to know the registration state of the user. In this embodiment, the AS may subscribe for the registration event notification of the user from the S-CSCF initiatively. In this way, the S-CSCF may send the registration state of the user to the AS.

Figure 4:
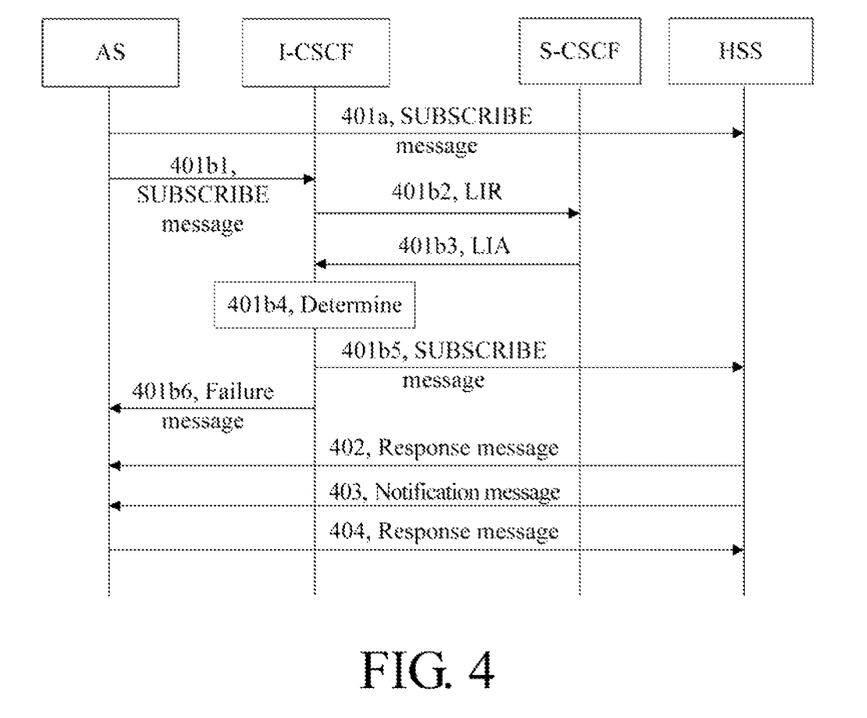
FIG. 4 is a flow chart showing a third embodiment of a method for notifying the state of a user to an AS according to an embodiment of the invention.

FIG. 4 is a flow chart showing a third embodiment of a method for notifying the state of a user to an AS.

Based on whether the AS knows the name or address of the S-CSCF in which the user resides, the AS may send a subscription message to the S-CSCF in two manners according to the third embodiment, as shown in FIG. 4.

If the AS can obtain the name or address of the S-CSCF in which the user resides before subscribing to the user's registration event, the process proceeds to step 401a.

If the AS cannot obtain the name or address of the S-CSCF in which the user resides before subscribing the user's registration event, the process proceeds to steps 401b1, 401b2, 401b3, 401b4, 401b5, and 401b6.

In step 401a, the AS finds that a user newly subscribes or activates a service on the AS, and the AS knows the name or address of the S-CSCF in which the user resides. The AS then sends a SUBSCRIBE message to the S-CSCF to subscribe for the user's registration event notification.

In other words, if the AS can obtain the name or address of the S-CSCF in which the user resides before subscribing to the user's registration event, the AS directly routes the subscription message to the S-CSCF in which the user resides.

In step 401b1, the AS finds that a user newly subscribes or activates a service on the AS, and the AS cannot obtain the name or address of the S-CSCF in which the user resides before subscribing the user's registration event. The AS then sends a SUBSCRIBE message to an Interrogating-Call Session Control Function (I-CSCF).

In step 401b2, the I-CSCF sends a location information request (LIR) message to the HSS, fills the user ID carried in the SUBSCRIBE message into the LIR, and inquires the HSS about the location information where the user currently resides, i.e., information about the S-CSCF in which the user resides.

In step 401b3, the HSS returns a location information answer (LIA) message to the I-CSCF.

Based on the user ID in the LIR, the HSS inquires the database about the information for the user, and returns the name or address of the S-CSCF in which the user resides or the capability set of the S-CSCF to the I-CSCF via the LIA message.

In step 401b4, the I-CSCF makes a determination on the received LIA message. If the HSS returns the name or address of the S-CSCF in which the user resides, the process proceeds to step 401b5; if the capability set of the S-CSCF is returned without the name or address of the S-CSCF, the process proceeds to step 401b6.

In step 401b5, the I-CSCF routes the SUBSCRIBE message to the S-CSCF to which the name or address of the S-CSCF returned from the HSS points.

In step 401b6, the I-CSCF returns messages 403, 480 or other messages indicating an error to the AS. This may indicate a subscription failure, and the subsequent steps of subscription by the AS will no longer be carried out.

If the HSS returns the capability set of the S-CSCF without returning the name or address of the S-CSCF, it indicates that the I-CSCF has not obtained the name or address of the S-CSCF, and the corresponding subscription procedure will not continue.

Because the AS cannot obtain the name or address of the S-CSCF in which the user resides before subscribing the user's registration event, the subscription message needs to be routed to an I-CSCF within the home domain of the user. The I-CSCF inquires the HSS about the name or address of the S-CSCF in which the user resides, and then routes the subscription message to the S-CSCF in which the user resides.

The above steps 401b1, 401b2, 401b3, 401b4, 401b5, and 401b6 provide detailed descriptions to this act.

In step 402, the S-CSCF returns a response message (200OK) to the AS, indicating a subscription success.

The message may be forwarded via the I-CSCF.

In step 403, the S-CSCF sends a NOTIFY message to the AS, returning the registration information of the user as requested by the AS.

The S-CSCF generates a NOTIFY message, including the current registration information of the user requested by the AS. Afterwards, the generated NOTIFY message is sent to the AS directly or via the I-CSCF.

The message may be forwarded via the I-CSCF.

In step 404, the AS returns a response message (200OK) to the S-CSCF.

The message may be forwarded via the I-CSCF.

The procedure ends now.

Descriptions have been made above to three different an embodiment of the method for notifying the state of the user to the AS according to the invention.

Figure 5:
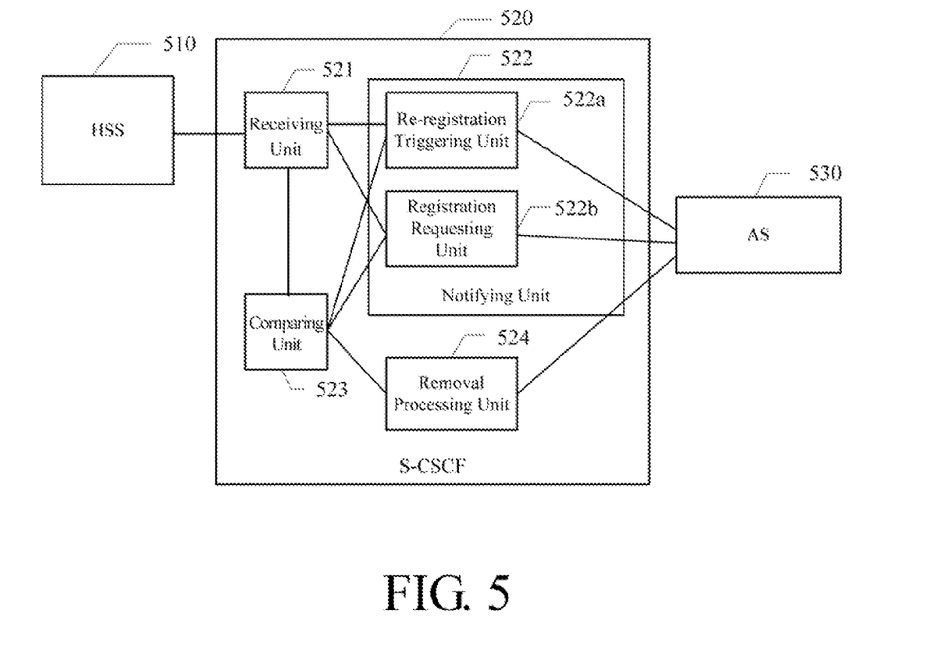
FIG. 5 is a block diagram showing a first embodiment of a system for notifying the state of a user to an AS according to an embodiment of the invention.

FIG. 5 is a block diagram showing a first embodiment of a system for notifying the state of a user to an AS according to an embodiment of the invention. As shown in FIG. 5, the system may include an HSS 510, an S-CSCF 520, and an AS 530. In practical applications, there may be more AS, but one AS is depicted in the figure of the embodiment as an example.

Specifically, the S-CSCF 520 includes a receiving unit 521, a notifying unit 522, a comparing unit 523, and a removal processing unit 524.

The receiving unit 521 is configured to receive new service profile information of a user sent from the HSS 510.

The notifying unit 522 is configured to send the registration information of the user to the corresponding AS 530 after receiving the service profile information.

Specifically, the notifying unit 522 may include a re-registration triggering unit 522a and a registration requesting unit 522b.

The re-registration triggering unit 522a is configured to generate and send a notification message to the UE of the user, to trigger the UE to initiate a re-registration procedure so that the registration information of the user can be sent to the AS related to the new service profile information.

The registration requesting unit 522b is configured to generate and send a third-party registration request to the AS related to the new service profile information, so as to carry the registration information of the user to the AS related to the new service profile information.

There may one or both of the re-registration triggering unit 522a and the registration requesting unit 522b.

The comparing unit 523 is configured to compare a new iFC carried in the service profile information with an original iFC stored in the S-CSCF after the receiving unit 521 receives the service profile information. When determining that a registration message trigger criteria is newly added to the new iFC, the re-registration triggering unit 522a triggers the UE to initiate a re-registration procedure, or the registration requesting unit 522b generates and sends a third-party registration request to an AS matching the newly added registration message trigger criteria.

When the comparing unit 523 determines that a registration message trigger criteria is removed from the new iFC, the removal processing unit 524 is configured to generate and send a cancel subscription message to an AS matching the removed registration message trigger criteria, so that the registration information of the user is sent to the AS matching the removed registration message trigger criteria.

The operation of the first embodiment of the system for notifying the state of the user to the AS is substantially the same as the first and second an embodiment of the method for notifying the state of the user to the AS as described above, and thus no description is repeated here.

The embodiment of the S-CSCF as provided in the invention is identical to the S-CSCF described in connection with the first embodiment of the system for notifying the state of the user to the AS according to the invention, and thus no description is repeated here.

Figure 6:
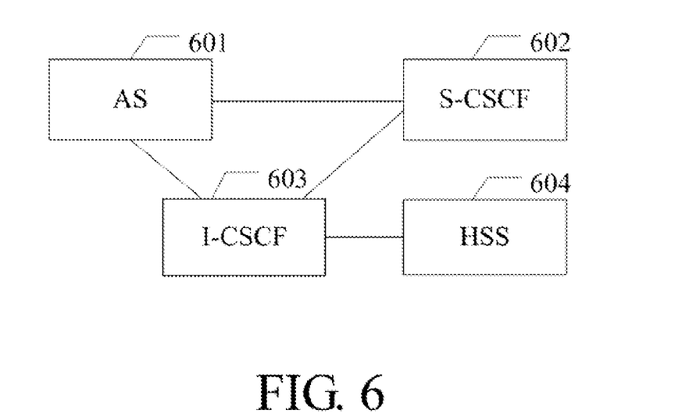
FIG. 6 is a block diagram showing a second embodiment of a system for notifying the state of a user to an AS according to an embodiment of the invention.

FIG. 6 is a block diagram showing a second embodiment of a system for notifying the state of a user to an AS according to an embodiment of the invention. The system includes an AS 601, an S-CSCF 602, an I-CSCF 603, and an HSS 604.

The AS 601 is configured to send a subscription message when the service profile information of a user changes.

The S-CSCF 602 is configured to send the user's registration information to the AS 601 upon receiving the subscription message.

The I-CSCF 603 is configured to receive the subscription message sent from the AS 601, to inquire the HSS 604 about the address of an S-CSCF in which the user resides, and to send the subscription message to the S-CSCF 602 to which the address of the S-CSCF points.

The name or address of the S-CSCF in which the user resides cannot be obtained before the AS subscribes the user's registration event. In this case, the subscription message has to be routed to an I-CSCF within the home domain of the user. The I-CSCF inquires the HSS about the name or address of the S-CSCF in which the user resides. Then, the I-CSCF routes the subscription message to the S-CSCF in which the user resides.

The HSS 604 is configured to provide the address of the S-CSCF in which the user resides.

The operation of the second embodiment of the system for notifying the state of the user to the AS is substantially the same as the second embodiment of the method for notifying the state of the user to the AS as described above, and thus no description is repeated here.

An embodiment of the AS provided in an embodiment of the invention may include an inquiring unit and a transmitting unit.

The inquiring unit is configured to inquire about the change in the service profile information of the user.

The transmitting unit is configured to send a subscription message to the S-CSCF in which the user resides when the inquiring unit detects a change in the service profile information of the user, so as to subscribe for the user's registration event notification.

The operation of the embodiment of the AS provided in an embodiment of the invention is substantially the same as the AS described in connection with the embodiment of the system for notifying the state of the user to the AS according to the invention, and thus no description is repeated here.

Those skilled in the art will appreciate that all or some of the steps for performing the method according to the above an embodiment may be implemented in a program by instructing an associated hardware. The program may be stored in a computer readable storage media, which may be a Read Only Memory (ROM), a magnetic disk, an optical disc, etc.

Detailed descriptions have been provided above to the method for notifying the state of the user to the AS, the system for notifying the state of the user to the AS, an S-CSCF, and an AS according to the invention. To those skilled in the art, various changes are possible in implementations and applications without departing from the scope of the invention. Therefore, the invention is not limited to the above descriptions.

What is claimed is:

1. A method for notifying a state of a user to an Application Server (AS), comprising:

receiving, by a Serving-Call Session Control Function (S-CSCF), new service profile information of the user sent from a Home Subscriber Server (HSS) when the user's service profile changes, comparing, by the S-CSCF, a new Initial Filter Criteria (iFC) carried in the new service profile information with an original iFC stored in the S-CSCF; and sending, by the S-CSCF, registration information of the user to an AS matching a registration message trigger criteria which is determined as being newly added in the new iFC, wherein after comparing the new iFC carried in the new service profile information with the original iFC stored in the S-CSCF, the method further comprises:

generating and sending, by the S-CSCF, a cancel subscription message to an AS matching a registration message trigger criteria which is determined as being removed from the new iFC, so that the registration information of the user is sent to the AS matching the removed registration message trigger criteria.

2. A method for notifying a state of a user to an Application Server (AS), comprising:

receiving, by a Serving-Call Session Control Function (S-CSCF), new service profile information of the user sent from a Home Subscriber Server (HSS) when the user's service profile changes;

comparing, by the S-CSCF, a new Initial Filter Criteria (iFC) carried in the new service profile information with an original iFC stored in the S-CSCF; and sending, by the S-CSCF, registration information of the user to an AS matching a registration message trigger criteria which is determined as being newly added in the new iFC wherein sending the registration information of the user to the AS comprises: triggering, by the S-CSCF, User Equipment (UE) of the user to initiate a re-registration procedure in which the S-CSCF sends the registration information of the user to the AS matching the registration message trigger criteria, wherein triggering the UE to initiate the re-registration procedure further comprises: sending, by the S-CSCF, a notification message to the UE of the user, the notification message comprising information for shortening a re-registration period, so that the UE initiates the re-registration procedure based on the notification message.

3. A Serving-Call Session Control Function (S-CSCF), comprising:

a receiving unit, configured to receive new service profile information of a user sent from a Home Subscriber Server (HSS) when the user's service profile changes;

a comparing unit, configured to compare a new Initial Filter Criteria (iFC) carried in the new service profile information with an original iFC stored in the S-CSCF after the receiving unit receives the new service profile information; and a notifying unit, configured to send registration information of the user to an AS matching a registration message trigger criteria which is determined as being newly added in the new iFC by the comparing unit, wherein the S-CSCF further comprises a removal processing unit,
wherein when the comparing unit determines that a registration message trigger criteria is removed from the new iFC, the removal processing unit is configured to generate and send a cancel subscription message to an AS matching the removed registration message trigger criteria so that the registration information of the user is sent to the AS matching the removed registration message trigger criteria.

4. The method for notifying the state of the user to the AS according to claim 2, wherein the notification message carries an element <registration>;
an event attribute in an element <contact> in the element <registration> is set to "shortened"; and
a expires attribute in the element <contact> in the element <registration> carries a value for shortening the re-registration period.

* * * * *